Figure 1:
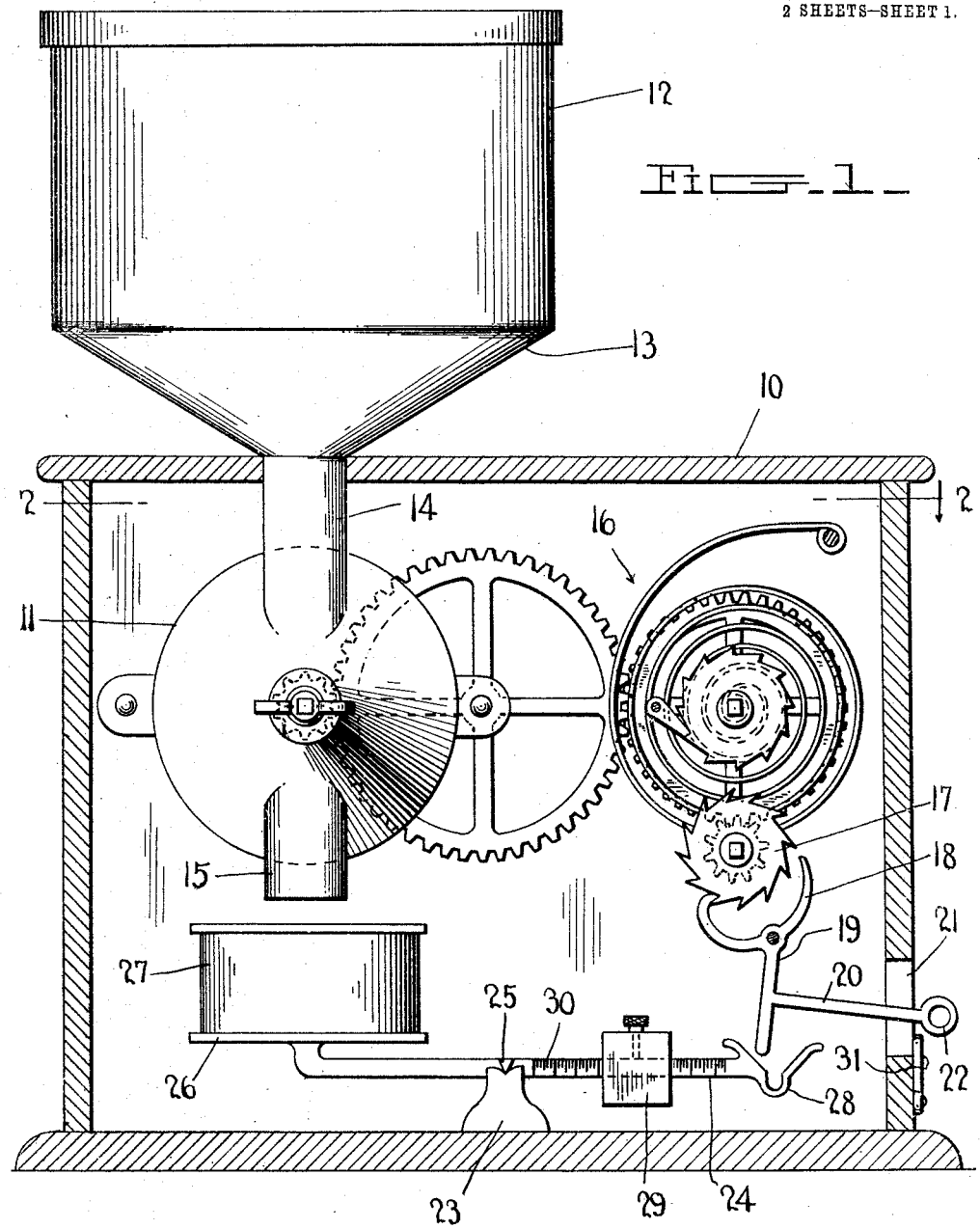

C. R. HUTCHINSON.
AUTOMATIC WEIGHING APPARATUS.
APPLICATION FILED MAY 24, 1910.

977,014.

Patented Nov. 29, 1910.
2 SHEETS—SHEET 1.

Witnesses
L. B. James
C. N. Woodward

Inventor
Clarence R. Hutchinson
By Chandler & Chandler
Attorneys

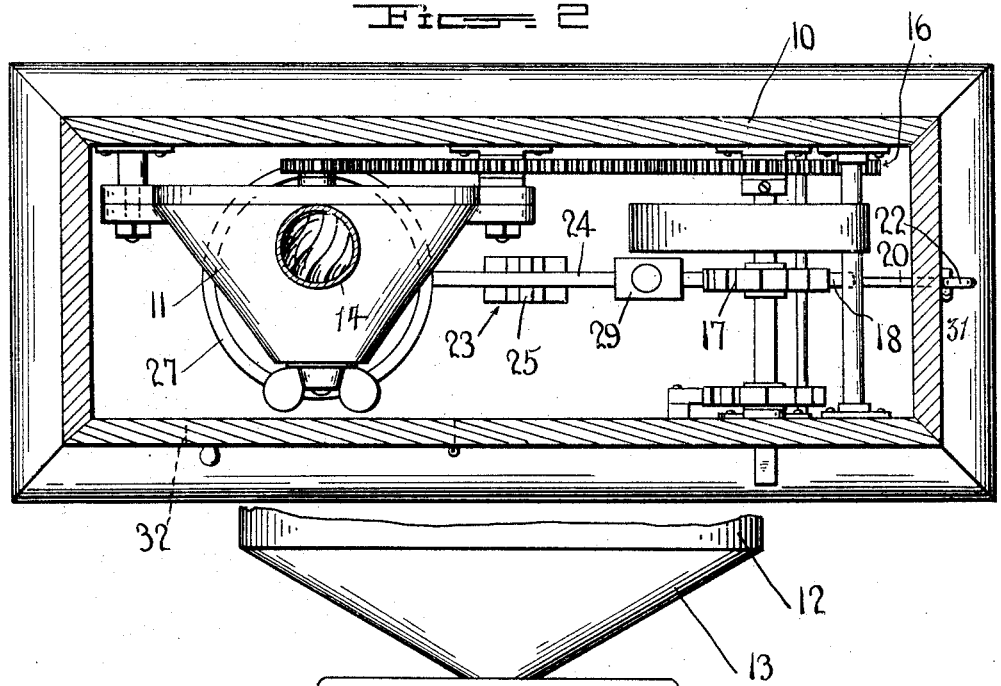
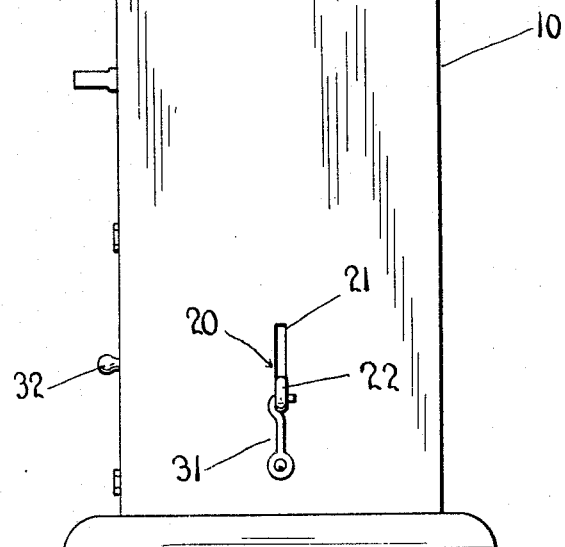

UNITED STATES PATENT OFFICE.

CLARENCE R. HUTCHINSON, OF FRENCH SETTLEMENT, LOUISIANA.

AUTOMATIC WEIGHING APPARATUS.

977,014.  Specification of Letters Patent.  Patented Nov. 29, 1910.

Application filed May 24, 1910. Serial No. 563,104.

*To all whom it may concern:*

Be it known that I, CLARENCE R. HUTCHINSON, a citizen of the United States, residing at French Settlement, in the parish of Livingston, State of Louisiana, have invented certain new and useful Improvements in Automatic Weighing Apparatus; and I do hereby declare the following to be a full, clear, and exact description of the invention, such as will enable others skilled in the art to which it appertains to make and use the same.

This invention relates to improvements in automatic grinding and weighing devices, and has for one of its objects to provide a simply constructed device whereby a grinding mill is operated and the outflow cut-off when a certain predetermined quantity of the material has been produced.

With this and other objects in view, the invention consists in certain novel features of construction as hereinafter shown and described and then specifically pointed out in the claims; and, in the drawings illustrative of the preferred embodiment of the invention, Figure 1 is a side elevation of the improved device with the casing in section, Fig. 2 is a plan view with the casing in section on the line 2—2 of Fig. 1, Fig. 3 is an end elevation of the improved device.

The improved device may be adapted for grinding substances or products of various kinds, but is designed more particularly for grinding coffee in quantities sufficient for use for the time being, and to automatically shut off the grinding when the required quantity has been produced, and for the purpose of illustration the improved device is shown thus applied, but it will be understood that it is not desired to limit the invention to employment in connection with any specific commodity or product. The improved device comprises a suitable casing 10 of any size and of any suitable material, and in which the grinding mill, represented conventionally at 11, is supported. A receiver for the coffee or other product before it is reduced is represented at 12, and will contain a relatively large quantity, and be retained in the receptacle until required for use, and then just sufficient to be used for the time being will be ground, and the bulk of the product retained in unground condition during the intervals of grinding. The receptacle is provided with a hopper-shaped bottom 13 from which a discharge spout 14 leads to the mill casing 11, while a discharge 15 leads from the lower end of the mill casing. A spring motor is mounted within the casing 10 and connected to operate the mill 11, and the motor is represented as a whole conventionally at 16, and includes in its construction a suitable escapement lever or arm 18.

Depending from the escapement lever 18 is a rigid arm 19, the arm being preferably integral with the escapement lever. A rod 20 projects from the bar 19 and extends through a suitable aperture 21 in the side of the casing 10 and is provided with a finger grip or eye 22, to enable the operator to readily grasp the rod and thus control the movement of the escapement lever, as hereinafter explained.

Supported within the casing 10 is a weighing device comprising a standard 23 upon which a balance beam 24 is poised at 25. The beam is provided at one end with a scale pan 26 to support a receptacle 27 to receive the product from the mill 11, and the opposite end of the beam is provided with a V-shaped socket 28, the latter being located directly beneath the free end of the bar 19, as shown in Fig. 1. Slidably disposed upon the beam 24 is a suitable weight 29, while the beam is provided with suitable graduations indicated at 30 to denote the weight of the product in the receptacle 27, so that any required quantity may be weighed. By this simple arrangement it will be obvious that so long as the receptacle 27 is empty the weight 29 will overcome the weight of the receptacle and maintain the socket 28 in its depressed position and disconnect it from the bar 19, leaving the latter free to vibrate under the influence of the escapement wheel 17, while the motor is running. By adjusting the weight 29 to correspond to the quantity of the product which it is desired shall be ground, the moment that the required quantity has been deposited in the receiver 27 the beam 24 will be depressed at the receptacle end and the socket 28 elevated and engaged with the vibrating lower end of the bar 19 and thus instantly stop the motion of the motor. If the operator desires to stop the motor manually he actuates the rod 20 by means of the finger grip 22.

A suitable latch 31 is connected to the casing 10 in position to be engaged with the rod 20 and hold the latter stationary when it is desired to hold the motor from operation, as for instance when it is desired not to grind the product. When a quantity of the product is desired, the operator adjusts the weight 29 to the required point upon the beam 24 and locates the receptacle 27 upon the scale pan 26 and beneath the discharge 15. The latch 31 is then released and the motor permitted to operate the mill, and when the required quantity has been ground the motor is automatically stopped as before described by the elevation of the socket 28. The operator then as a matter of precaution connects the latch 31 to the rod 20 and removes the receptacle from the weighing device.

The casing 10 will be provided with suitable doors in its sides to enable the weight to be adjusted and the receptacle 27 to be deposited and removed, and the location of this door is indicated at 32 by dotted lines.

The improved device is simple in construction, can be manufactured in any required size and with the mill and the motor of any required power or capacity, and adapted for grinding various products.

What is claimed is:—

1. The combination with a grinding mill, of a motor operatively connected to said mill and including an escapement device having an arm partaking of its vibratory motion, a weighing device including a balanced beam adapted to support a receiver for the product of the mill and having a socket for engaging when in one position with said escapement arm, said weighing device arranged for operation when a predetermined quantity of material has been discharged from the mill to automatically couple the socket with the escapement arm and stop the motor.

2. The combination with a grinding mill, of a motor operatively connected to said mill and including an escapement device having an arm partaking of its vibratory motion, a weighing device including a balanced beam adapted to support a receiver for the product of the mill and having a socket for engaging when in one position with said escapement arm, a rod extending from said escapement arm, and a stop latch for engaging said rod.

3. The combination with a motor including an escapement device having an arm partaking of its vibratory motion, a weighing device including a balanced beam having a receiver and with a socket for engaging when in one position with said escapement arm, whereby the balanced beam is operated and coupled by its socket to the arm and the motor stopped when a certain predetermined quantity of material is deposited in the receiver.

4. The combination with a motor including an escapement arm which partakes of its motion, a body from which material is discharged, means operative by said motor for causing the discharge of said material, a weighing device including a balanced beam having a receiver for the product of said body, and with a socket for engaging when in one position with said arm, said weighing device arranged for operation when a predetermined quantity of material has been discharged from the body and to automatically couple the socket with the escapement arm and stop the motor.

In testimony whereof, I affix my signature, in presence of two witnesses.

CLARENCE R. HUTCHINSON.

Witnesses:
RICHARD J. D'AQUIN,
H. M. JANEAUT.